(12) United States Patent
Marukawa et al.

(10) Patent No.: US 11,136,067 B2
(45) Date of Patent: Oct. 5, 2021

(54) VEHICLE ROOF STRUCTURE

(71) Applicant: HONDA MOTOR CO., LTD., Tokyo (JP)

(72) Inventors: Taiga Marukawa, Wako (JP); Tomoaki Hosobe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/623,418

(22) PCT Filed: Jul. 7, 2017

(86) PCT No.: PCT/JP2017/024979
§ 371 (c)(1),
(2) Date: Dec. 17, 2019

(87) PCT Pub. No.: WO2019/008746
PCT Pub. Date: Jan. 10, 2019

(65) Prior Publication Data
US 2020/0114974 A1 Apr. 16, 2020

(51) Int. Cl.
*B60J 10/70* (2016.01)
*B62D 25/04* (2006.01)
(Continued)

(52) U.S. Cl.
CPC ............... *B62D 25/06* (2013.01); *B60J 1/02* (2013.01); *B60J 10/40* (2016.02); *B60J 10/70* (2016.02);
(Continued)

(58) Field of Classification Search
CPC ... B60J 10/15; B60J 10/16; B60J 10/20; B60J 10/23; B60J 10/40; B60J 10/70;
(Continued)

(56) References Cited

U.S. PATENT DOCUMENTS 4,792,180 A 12/1988 Jacobsen et al.
2015/0061313 A1* 3/2015 Watou ................ B29D 99/0053
296/93

FOREIGN PATENT DOCUMENTS

CN 102407812 4/2012
CN 105480064 4/2016
(Continued)

OTHER PUBLICATIONS

Chinese Office Action for Chinese Patent Application No. 201780092511.2 dated Jul. 5, 2021.

*Primary Examiner* — Dennis H Pedder
(74) *Attorney, Agent, or Firm* — Amin, Turocy & Watson, LLP (57) ABSTRACT

A vehicle roof structure has a roof panel and a roof side rail joined at a joint part that extends substantially in a vehicle body front-rear direction, and a recessed groove which opens to an upper side of the vehicle body and extends substantially along the vehicle body front-rear direction is provided in an upper part of the joint part. The roof side rail has a rail main part that is disposed on an outer side in a vehicle width direction of the roof panel across the joint part, and a rail extension part that extends forward from a front end part of the rail main part. The rail extension part is provided with a glass-receiving part that is disposed to be offset to the outer side in the vehicle width direction from the joint part when viewed from above, and receives the upper end side part of the windshield glass. The rail main part has a rail main face that forms the outer surface of the vehicle, and a shelf face that is provided in the front end part of the rail main face to be recessed downward, and to which a lower face of the side end part of the windshield upper molding abuts.

6 Claims, 7 Drawing Sheets

(51) Int. Cl.
*B62D 25/06* (2006.01)
*B60J 1/02* (2006.01)
*B60R 13/04* (2006.01)
*B60J 10/40* (2016.01)
*B60J 10/34* (2016.01)

(52) U.S. Cl.
CPC .............. *B60R 13/04* (2013.01); *B62D 25/04* (2013.01); *B60J 10/34* (2016.02)

(58) Field of Classification Search
CPC .. B60J 10/90; B60J 1/02; B62D 25/02; B62D 25/04; B62D 25/06
USPC ............ 296/96.21, 93, 84.1, 193.06, 203, 1, 296/203.02
See application file for complete search history.

(56) References Cited

FOREIGN PATENT DOCUMENTS

| | | |
|---|---|---|
| DE | 102007063475 | 6/2009 |
| FR | 2916707 | 12/2008 |
| JP | 06-053372 | 7/1994 |
| JP | 3644290 | 4/2005 |
| JP | 2011-084220 | 4/2011 |
| JP | 2014-069610 | 4/2014 |

\* cited by examiner

VEHICLE ROOF STRUCTURE

TECHNICAL FIELD

The present invention relates to a vehicle roof structure.

BACKGROUND ART

As a vehicle roof structure, a structure in which roof side rails disposed substantially along a vehicle body front-rear direction are joined to both left and right sides of a roof panel constituting a roof part of a vehicle, and a windshield glass is arranged at a front part of the roof panel is known. In this type of roof structure, a windshield upper molding is mounted on an upper edge part of the windshield glass, and the windshield upper molding abuts a front edge part of the roof panel.

Further, in this type of roof structure, front pillars are connected to the front end parts of the left and right roof side rails to be continuous with each roof side rail. A windshield side molding is attached to inner sides of each front pillar in a vehicle width direction, and a lip part of the windshield side molding abuts on a side edge part of the windshield glass.

The roof side rail has a rail main part disposed on the outer side of the roof panel in the vehicle width direction, and an extension part extending forward from a front end part of the rail main part, and a front pillar is connected to the extension part. The extension part and the front pillar are arranged to be offset outward in the vehicle width direction from a joint part between the roof panel and the roof side rail when viewed from above. A glass-receiving part which receives the side part of the windshield glass is provided on an inner edge part in the vehicle width direction. A windshield upper molding mounted on the upper edge part of the windshield glass has a central region in the vehicle width direction being in contact with the front edge part of the roof panel, and a side end part region disposed in an upper region of the glass-receiving part.

In many conventional vehicles, the side part of the roof panel and a loose side rail are joined to each other by spot welding or the like, a relatively wide substantially U-shaped groove continuous in the vehicle body front-rear direction is formed above the joined part, and a roof side molding is mounted inside the recessed groove. In the case of a roof structure having such a structure, a front end part of the roof side molding protrudes to an extension position of the windshield upper molding at the front part of the roof panel, and the side edge part of the windshield upper molding is supported from below by the front end part of the roof side molding.

In the way, a roof structure in which the side part of the roof panel and the roof side rail are continuously joined in the vehicle body front-rear direction by laser welding, and a narrow recessed groove is formed in an upper part of the joined part has been devised (for example, refer to Patent Document 1). The recessed groove opens to the upper side of the vehicle body and extends substantially along the vehicle body front-rear direction. In the case of this roof structure, since the width of the recessed groove is narrow, the roof side molding is not disposed in the recessed groove.

In such a roof structure having no roof side molding, the side edge part of the windshield upper molding cannot be supported from below by the front end part of the roof side molding. For this reason, it is feared that the side edge part of the windshield upper molding may drop downward at an extension position of the recessed groove and an appearance from the outside may be degraded.

CITATION LIST

[Patent Document]
[Patent Document 1]
Japanese Patent No. 3644290

SUMMARY OF INVENTION

Technical Problem

An object of the present invention is to prevent deterioration in the appearance due to dropping down of the side edge part of the windshield upper molding.

Solution to Problem

A vehicle roof structure according to the present invention includes a roof panel which forms a roof part of a vehicle body; a roof side rail disposed substantially along a vehicle body front-rear direction on an outer side of the roof panel in a vehicle width direction; a windshield glass disposed in a front part of the roof panel; and a windshield upper molding which is mounted on an upper edge part of the windshield glass and abuts a front edge part of the roof panel. The roof panel and the roof side rail are joined at a joint part substantially in the vehicle body front-rear direction, and a recessed groove which opens to an upper side of the vehicle body and extends substantially along the vehicle body front-rear direction is provided at an upper part of the joint part. The roof side rail has a rail main part disposed on an outer side of the roof panel in the vehicle width direction across the joint part, and a rail extension part which extends forward from a front end part of the rail main part. A glass-receiving part, which is disposed to be offset to the outer side in the vehicle width direction from the joint part when viewed from above to receive an upper end side part of the windshield glass, is provided in the rail extension part. The rail main part has a rail main face which forms an outer surface of the vehicle, and a shelf face which is provided to be recessed downward at a front end part of the rail main face, and on which a lower face of a side end part of the windshield upper molding abuts.

With the aforementioned configuration, the windshield upper molding mounted on the upper edge part of the windshield glass abuts the front edge part of the roof panel, and the lower face of the side end part abuts the shelf face of the roof side rail across the recessed groove of the joint part. For this reason, downward dropping of the side end part of the windshield upper molding is curbed by the shelf face.

The roof panel may have a roof upper face which forms a roof face of the vehicle body, a roof front end face which extends downward from a front end side of the roof upper face, and a roof connecting face which connects the roof upper face and the roof front end face, the shelf face may be formed to be flush with the roof connecting face across the recessed groove, and the windshield upper molding may abut on the roof connecting face and the shelf face.

In this case, a central region of the windshield upper molding abuts the roof connecting face of the roof panel, and the side end part of the windshield upper molding abuts the shelf face of the roof side rail which is flush with the roof connecting face. For this reason, bending of the windshield upper molding can be curbed and the appearance can be further improved.

The rail main part may include a downward extending face which extends downward from a front end part of the shelf face, and the roof front end face and the downward extending face may be formed to be flush with each other.

In this case, it is possible to prevent either one of the roof front end face and the downward extending face from interfering with the upper end face of the windshield glass. For this reason, it is possible to curb any great enlargement of the clearance between either one of the roof front end face and the downward extending face, and the windshield glass. Further, since there is no height deviation between the roof front end face and the downward extending face, a sealing material can be easily and reliably applied to the gap between the roof front end face and the downward extending face.

A space between the roof front end face and the downward extending face may be sealed with a sealing material, and the windshield upper molding may abut on a rear side of a portion to which the sealing material is applied between the roof front end face and the downward extending face.

In this case, the portion in which the sealing material is applied between the roof front end face and the downward extending face is covered and concealed with the windshield upper molding. For this reason, it is possible to curb deterioration in the exterior appearance due to a portion to which the sealing material is applied.

A windshield side molding which abuts the side edge part of the windshield glass may be provided in the rail extension part of the roof side rail, and the windshield side molding may abut on an upper face of the side end part of the windshield upper molding.

In this case, the side edge part of the windshield upper molding can be covered and concealed with the windshield side molding. Therefore, when this configuration is adopted, the appearance from the outside can be further improved.

The windshield side molding may have a lip part which abuts the side edge part of the windshield glass and the upper face of the side end part of the windshield upper molding, and the lip part may overlap the shelf face via the side end part of the windshield upper molding.

In this case, since the lip part of the windshield side molding overlaps the shelf face via the side end part of the windshield upper molding, the bending of the side end part of the windshield upper molding is suppressed. Also, since the side end part of the windshield upper molding is sandwiched between the shelf face and the lip part of the windshield side molding, it is possible to prevent an occurrence of a gap between the side end part of the windshield upper molding and the windshield side molding. Therefore, when this configuration is adopted, the appearance is further improved.

Advantageous Effects of Invention

The vehicle roof structure of the present invention is configured so that a shelf face is provided at the front end part of the rail main face of the roof side rail, and the lower face of the side end part of the windshield upper molding abuts the shelf face. Accordingly, it is possible to suppress the downward drop of the side end part of the windshield upper molding by the shelf face. Therefore, according to this invention, it is possible to prevent degradation of the appearance due to the drop of the side end part of the windshield upper molding.

DESCRIPTION OF EMBODIMENTS

Hereinafter, embodiments of the present invention will be described with reference to the drawings. In the following description, forward, rearward, upward, downward, left and right mean front, rear, top, bottom, and left and right in a vehicle unless otherwise specified. In addition, an arrow FR in the drawing indicates a front side of the vehicle, an arrow UP indicates an upper side of the vehicle, and an arrow LH indicates a left side of the vehicle.

Figure 1:
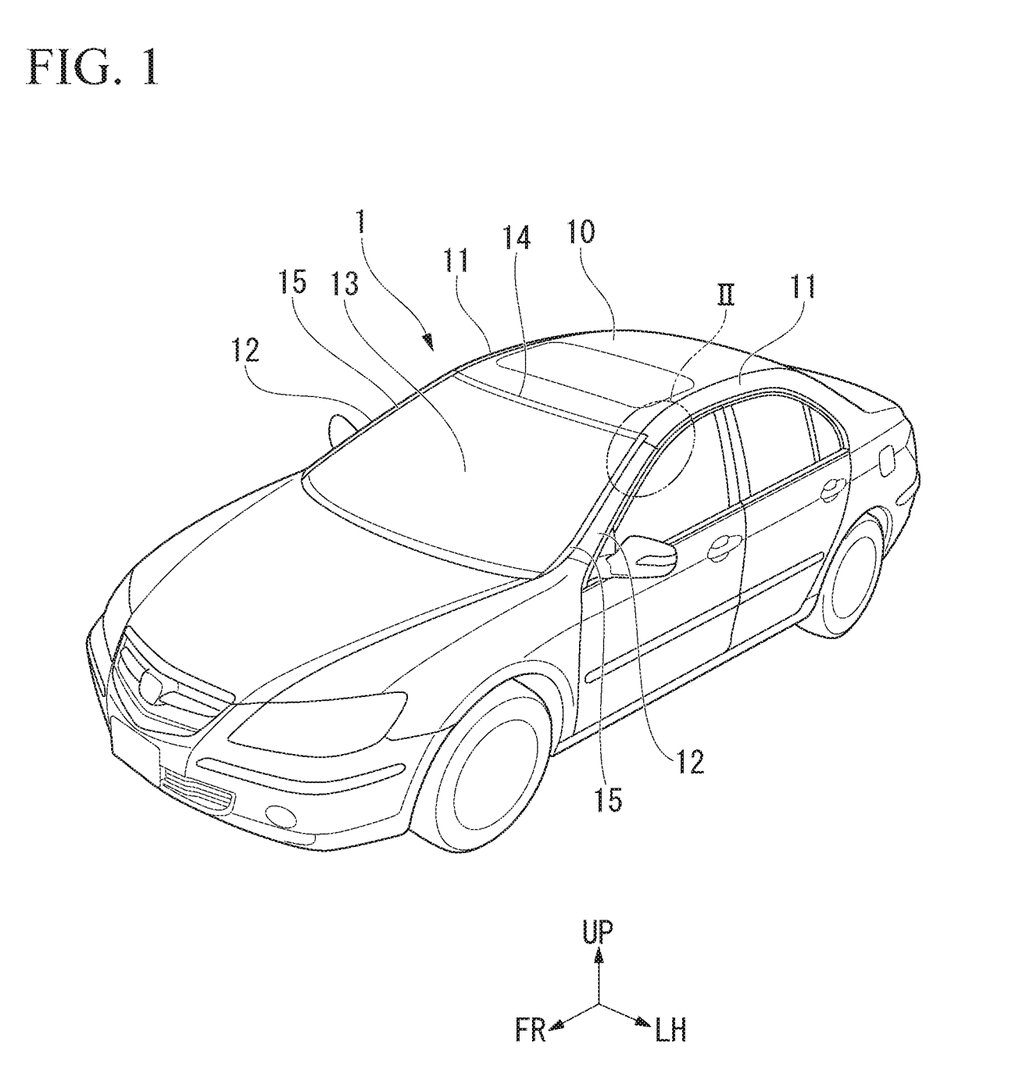
FIG. 1 is a perspective view of a vehicle according to an embodiment.

FIG. 1 is a view of a vehicle 1 that adopts a roof structure of the present embodiment as viewed obliquely from in front and above.

A roof panel 10 is disposed on a roof part of the vehicle, and roof side rails 11 are attached to both edge parts of the roof panel 10 on an outer side in the vehicle width direction. Each of the left and right roof side rails 11 has a structure in which a closed cross section is continuous in a vehicle body front-rear direction.

A front pillar 12 having a closed cross section continuous with the roof side rail 11 is connected to a front end part of the roof side rail 11. The front pillar 12 extends from the front end part of the roof side rail 11 obliquely downward and forward. A windshield glass 13 is disposed in a region surrounded by the front end part of the roof panel 10 and the left and right front pillars 12.

Figure 2:
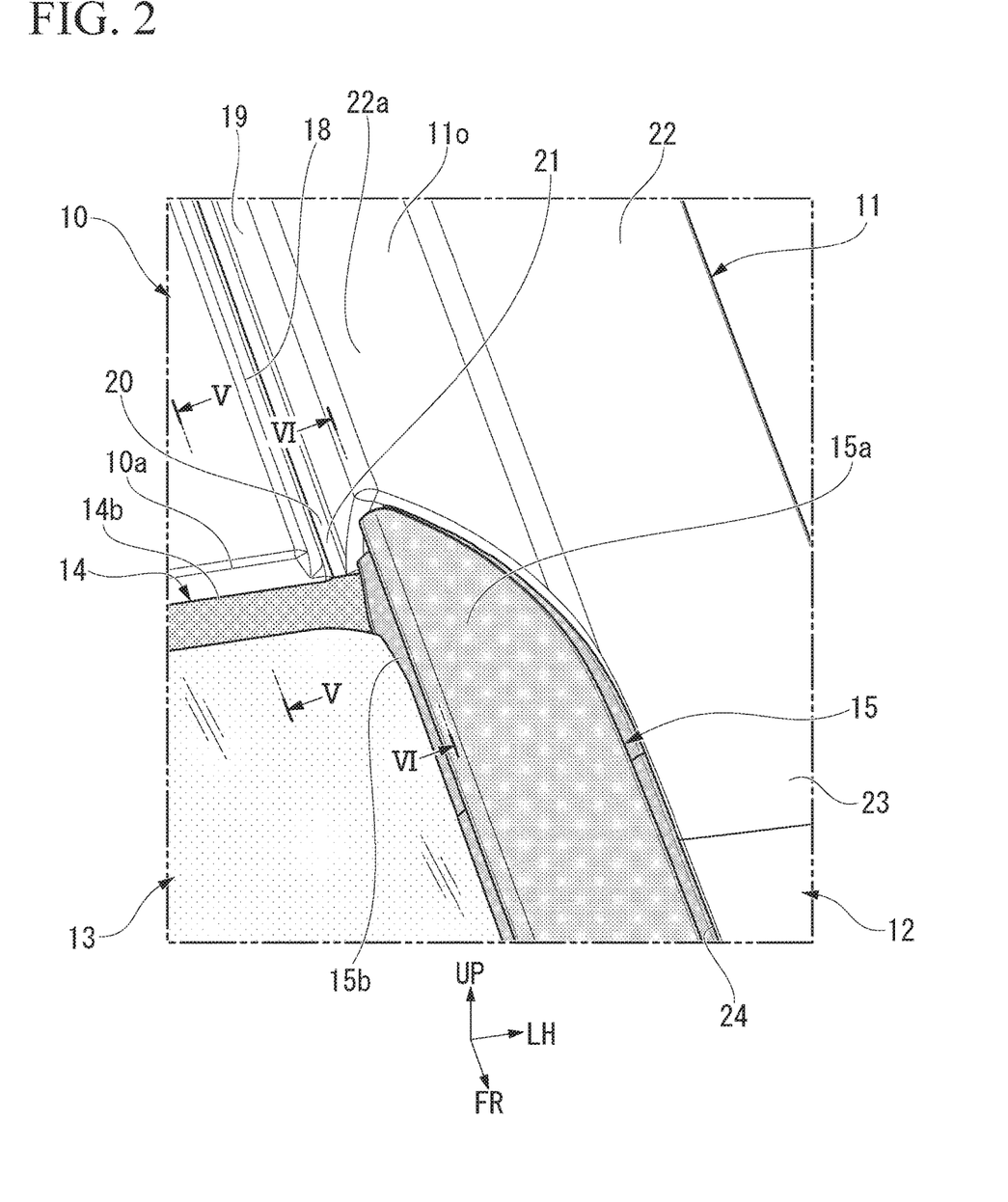
FIG. 2 is a perspective view of a roof structure according to the present embodiment, showing an enlarged view of a part H of FIG. 1.

FIG. 2 is an enlarged view of a part II of FIG. 1.

As shown in FIG. 2, a resin windshield upper molding 14 that abuts a front edge part of the roof panel 10 is mounted on an upper edge part of the windshield glass 13. In addition, resin windshield side moldings 15 that are in contact with the upper faces of the side edge parts of the windshield glass 13 are attached to the inner regions of the left and right front pillars 12 in the vehicle width direction.

Figure 3:
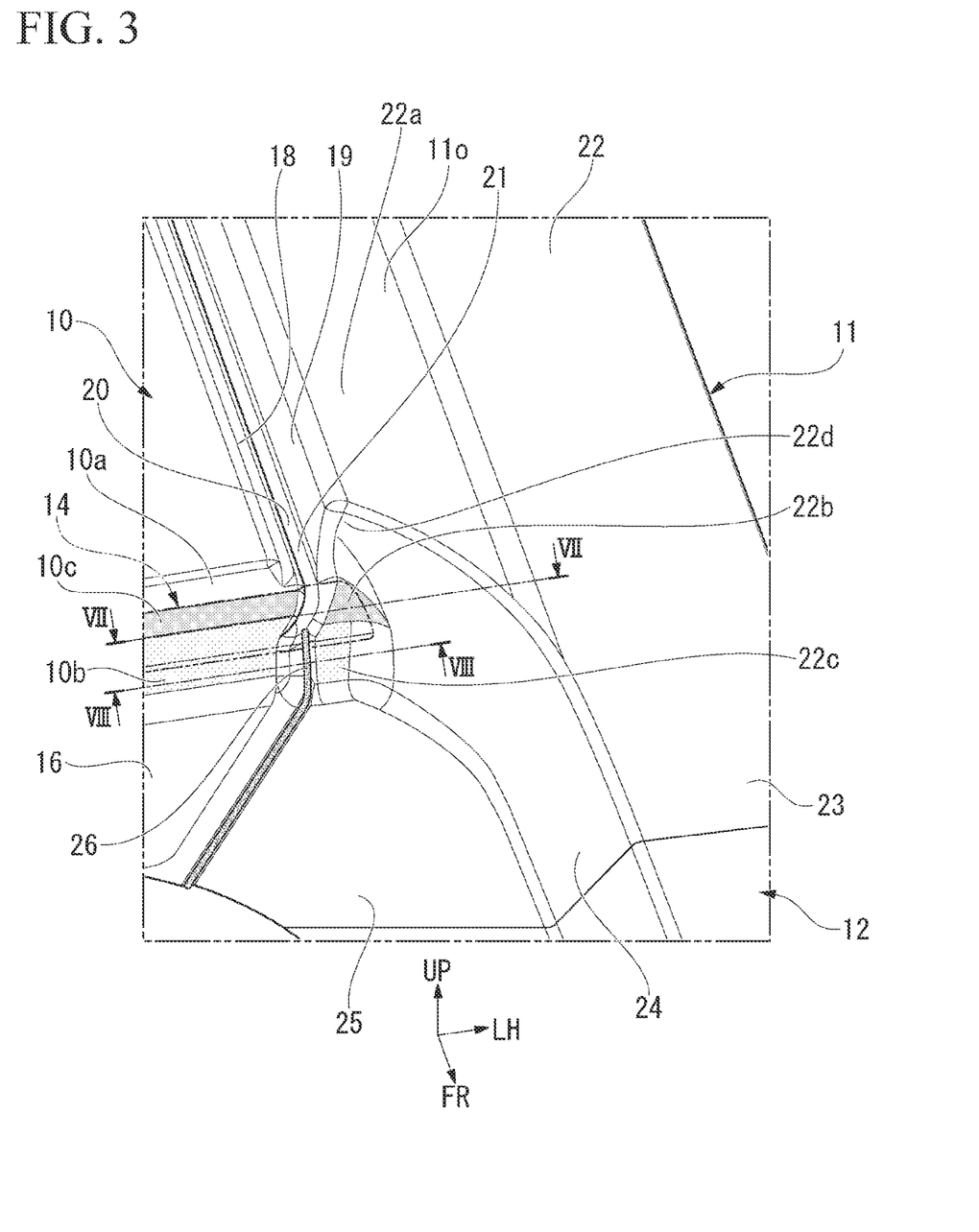
FIG. 3 is a perspective view similar to FIG. 2 with some members removed.
Figure 4:
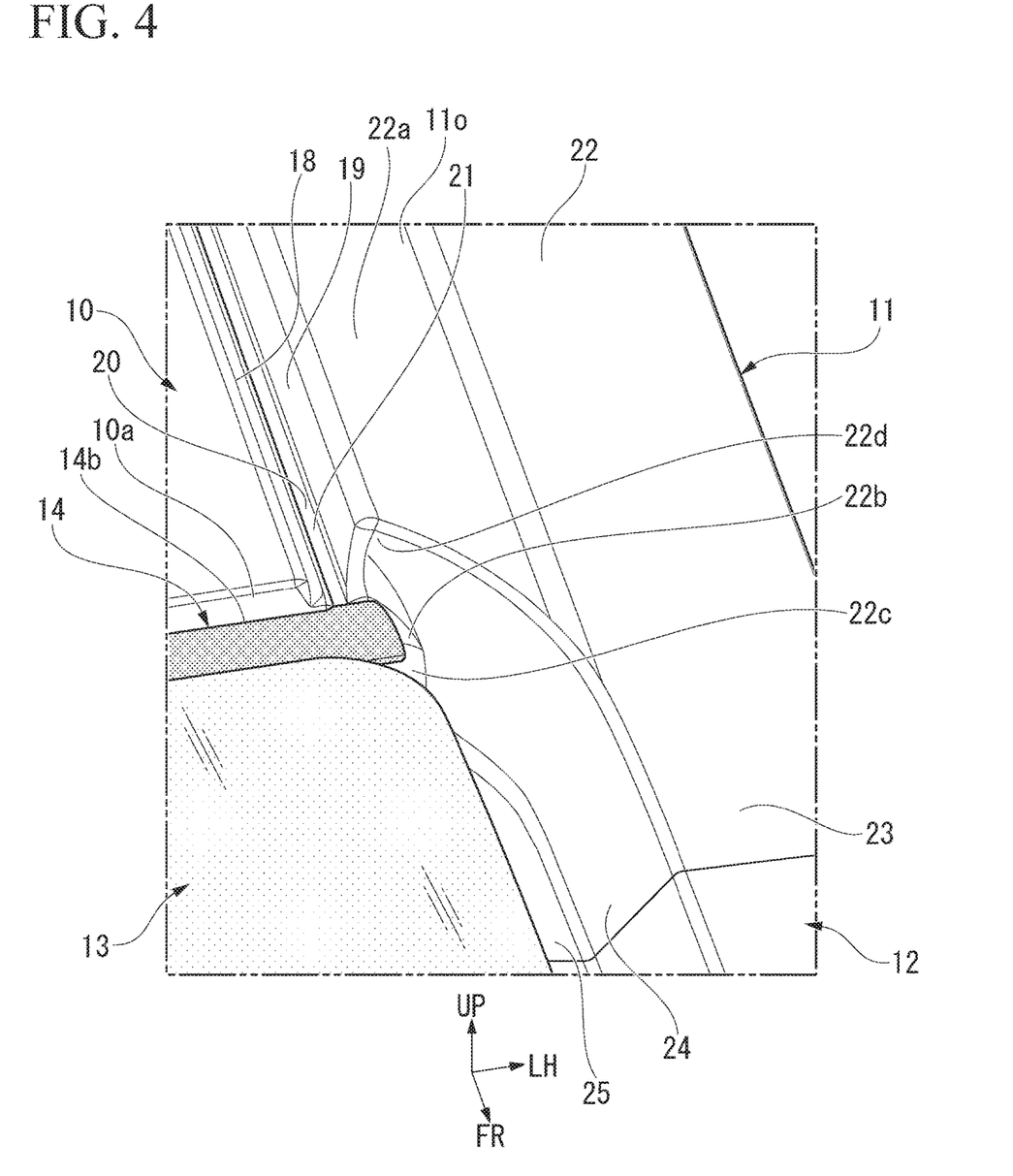
FIG. 4 is a perspective view similar to FIG. 2 with some members removed.
Figure 5:
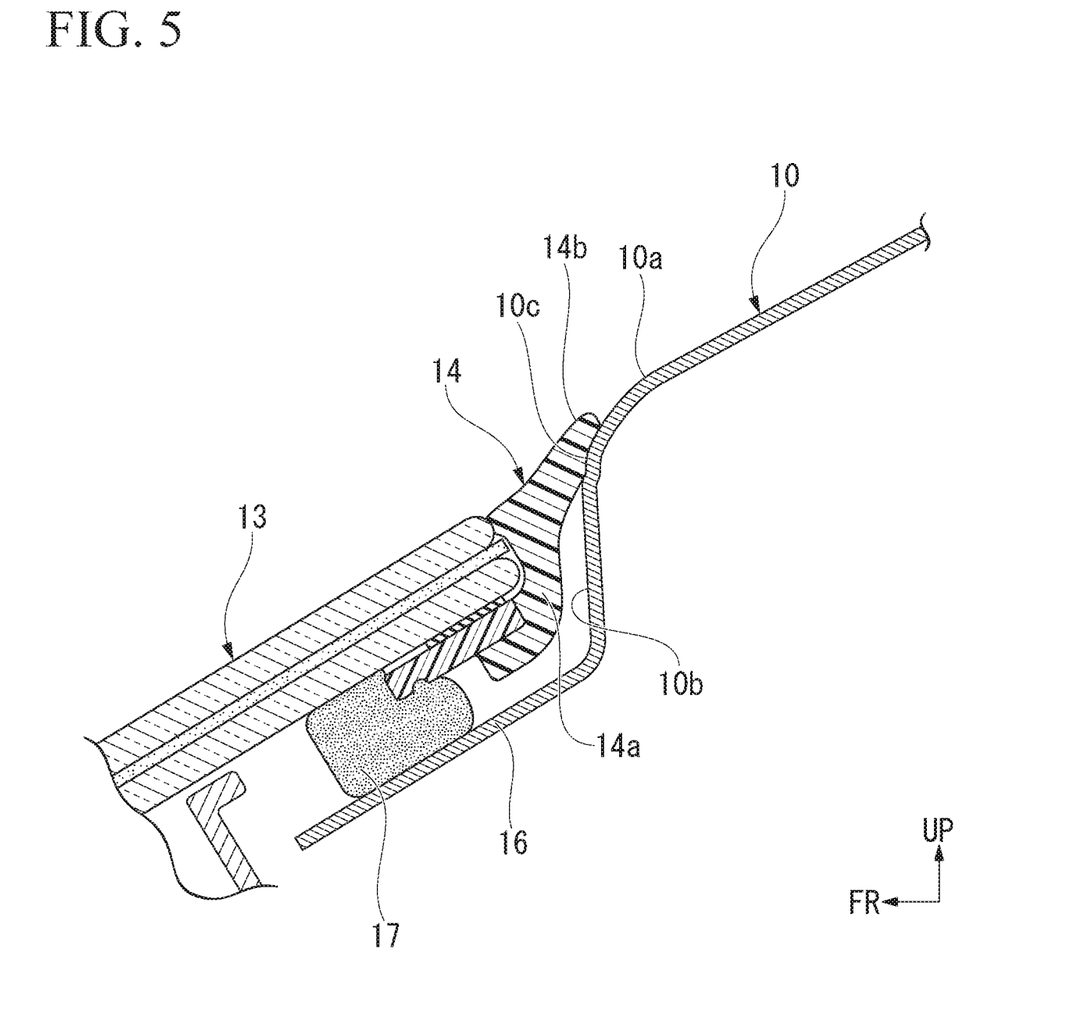
FIG. 5 is a cross-sectional view taken along a line V-V of FIG. 1 of the roof structure according to the present embodiment.
Figure 6:
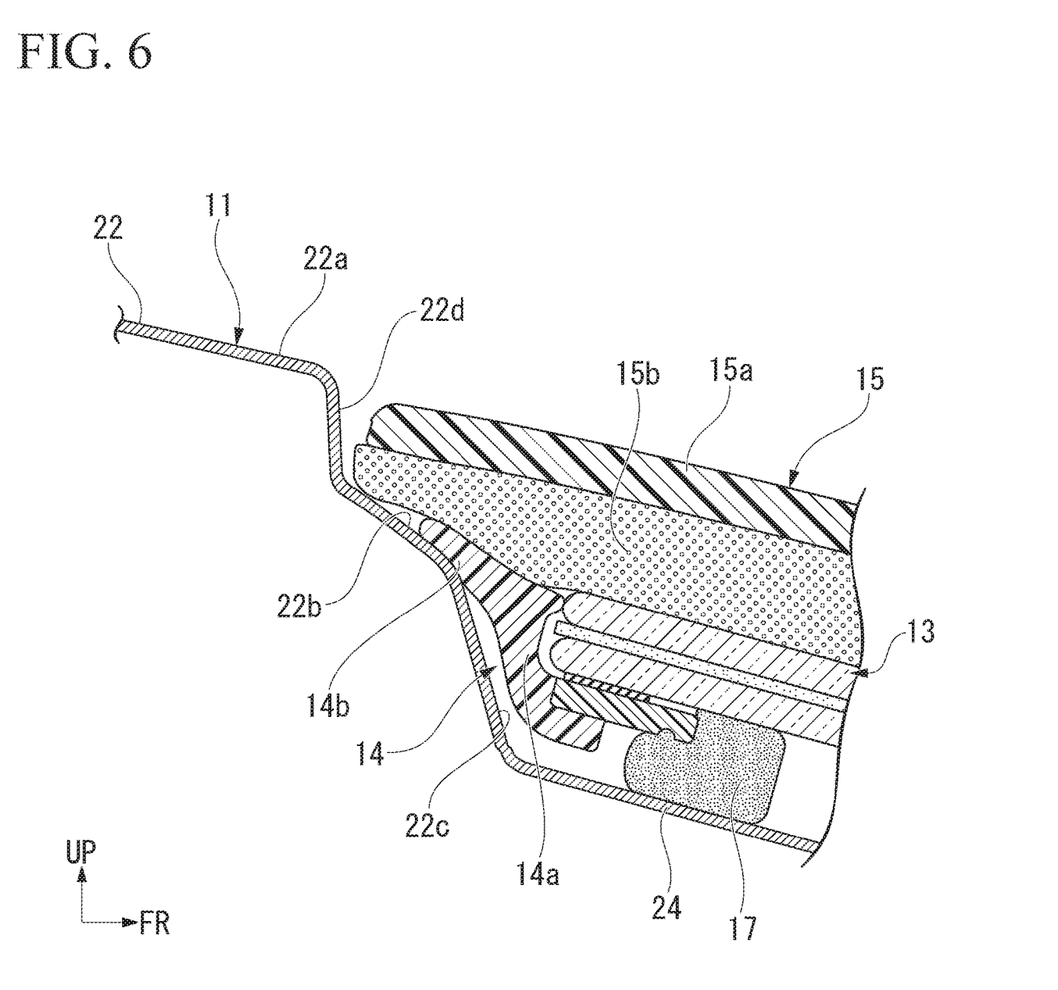
FIG. 6 is a cross-sectional view taken along a line VI-VI of FIG. 1 of the roof structure according to the present embodiment.
Figure 7:
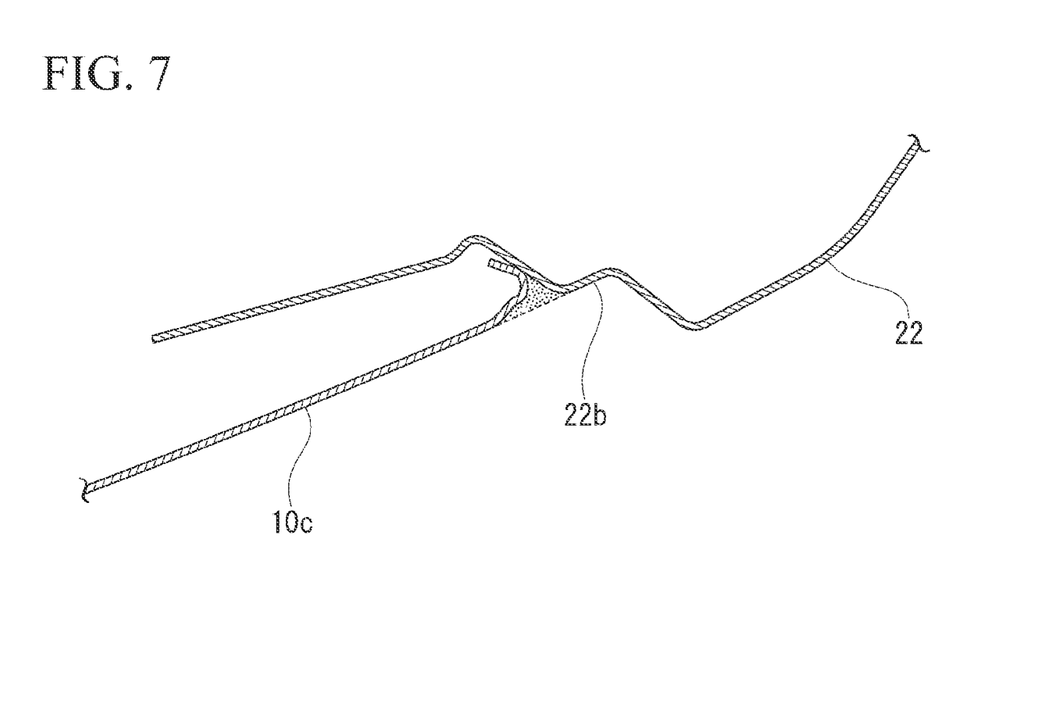
FIG. 7 is a cross-sectional view of the roof structure according to the present embodiment.
Figure 8:
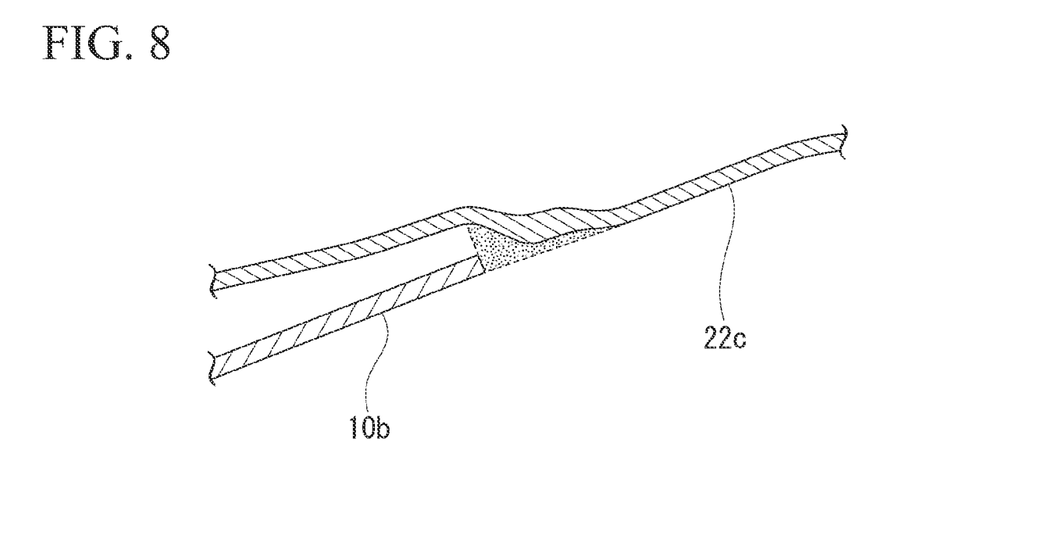
FIG. 8 is a cross-sectional view of the roof structure according to the present embodiment.

FIG. 3 is a view similar to FIG. 2 in which the windshield side molding 15 and the windshield upper molding 14 are removed, and FIG. 4 is a view similar to FIG. 2 in which the windshield side molding 15 is removed. Further, FIG. 5 is a view showing a cross section taken along a line V-V of FIG. 2, and FIG. 6 is a view showing a cross section taken along a line VI-VI of FIG. 2.

A lower bent wall 18 that bends downward extends from the left and right side end parts of the roof panel 10. The side end parts of the roof panel 10 are joined to the corresponding roof side rail 11 at the portion of the lower bent wall 18.

Further, as shown in FIG. 3, the roof panel 10 has a roof upper face 10a that forms a roof face of the vehicle body, a roof front end face 10b that extends downward from the front end side of the roof upper face 10a, and a roof connecting face 10c that connects the roof upper face 10a and the roof front end face 10b. The roof upper face 10a is inclined toward the front lower part in the vicinity of the front end part, and a slightly curved roof connecting face 10c is connected to an inclined front end part thereof. The roof connecting face 10c is provided continuously along the vehicle width direction of the roof panel 10. A roof side glass support wall 16 bent forward at substantially right angles extends from the lower end of the roof front end face 10b. As shown in FIG. 5, the front edge part of the windshield glass 13 is glued to the upper face of the roof side glass support wall 16 with an adhesive 17.

In the roof side rail 11, a roof side outer panel 11o and a roof side inner panel (not shown) are joined together to form a closed cross-section substantially extending in the vehicle body front-rear direction. The roof side outer panel 11o is provided with a vertical wall 19 extending along the vehicle body front-rear direction in an inner region in the vehicle width direction. An intermediate region of the vertical wall 19 in the vertical direction is caused to abut on the lower bent wall 18 of the roof panel 10, and the upper end part of the abutting part are joined to each other by laser welding. The laser welding is performed continuously substantially along the vehicle body front-rear direction with respect to the abutting part between the roof panel 10 and the roof side outer panel 11o. A narrow recessed groove 21 having a substantially U-shaped cross section is provided on the upper part of the joint part 20 formed by laser welding of the lower bent wall 18 and the vertical wall 19. The recessed groove 21 opens to the upper side of the vehicle body and extends substantially along the vehicle body front-rear direction.

Further, the roof side rail 11 has a rail main part 22 disposed on the outer side of the roof panel 10 in the vehicle width direction across the recessed groove 21 of the joint part 20, and a rail extension part 23 that extends forward from the front end part of the rail main part 22. The rail extension part 23 is provided with a glass-receiving part 24 that is disposed to be offset to the outer side in the vehicle width direction from the joint part 20 when viewed from above and receives the upper end side part of the windshield glass 13. A side part side glass support wall 25 that is bent substantially at a right angle to the inner side in the vehicle width direction extends from the lower end of the glass-receiving part 24 on the inner side in the vehicle width direction. The side part side glass support wall 25 is caused to abut on the end part of the roof glass support wall 16. The front pillar 12 is connected to the front end part of the rail extension part 23.

The rail main part 22 has a rail main face 22a that forms an outer surface of the vehicle at the side part of the roof panel 10, a shelf face 22b which is provided to be recessed downward in a stepped shape at a front end part of the rail main face 22a and on which the lower face of the side end part of the windshield upper molding 14 abuts, and a downward extending face 22c which extends downward from the front end part of the shelf face 22b. The shelf face 22b is formed to be flush with the roof connecting face 10c of the roof panel 10 across the front end region of the recessed groove 21 of the joint part 20. Further, the downward extending face 22c is formed to be flush with the roof front end face 10b at the front part of the roof panel 10. Further, the shelf face 22b is connected to the lower end of the first front face 22d extending downward from the front end part of the rail main face 22a, and extends forward from the lower end of the first front face 22d. The downward extending face 22c extending downward from the front end part of the shelf face 22b constitutes a second front face of the rail main part 22.

As shown in FIG. 5, the windshield upper molding 14 has an attachment base part 14a attached to the upper end part of the windshield glass 13, and a lip part 14b which extends rearward and obliquely upward from the upper end part of the windshield glass 13 of the attachment base part 14a in the thickness direction. The lip part 14b of the windshield upper molding 14 is adapted to abut on the roof connecting face 10c (see FIG. 5) of the front part of the roof panel 10 and the shelf face 22b (see FIG. 6) of the rail main part 22 of the roof side rail 11 from the upper face side.

As shown in FIG. 3, the side end part of the roof front end face 10b of the roof panel 10 abuts the side end part of the downward extending face 22c of the roof side rail 11. Further, the side end part of the roof side glass support wall 16 of the lower end of the roof front end face 10b also abuts the side end part of the side part side glass support wall 25 of the lower end of the downward extending face 22c. The abutted portions are sealed with a sealing material 26. The lip part 14b of the windshield upper molding 14 is set to abut on the rear side of a portion coated with the sealing material 26 between the roof front end face 10b and the downward extending face 22c.

Here, an upper edge part of the windshield side molding 15 disposed in the inner region of the front pillar 12 in the vehicle width direction is disposed in the inner region of the rail extension part 23 of the roof side rail 11 in the vehicle width direction. As shown in FIGS. 2 and 6, the windshield side molding 15 has a hard resin molding base part 15a fixed to the front pillar 12 or the rail extension part 23, and a soft resin lip part 15b provided integrally on the lower face of the molding base part 15a closer to the inner side in the vehicle width direction. The lip part 15b abuts the upper face of the side edge part of the windshield glass 13. Further, the upper end part of the windshield side molding 15 extends over the upper face of the side end part of the windshield upper molding 14 to the shelf face 22b of the roof side rail 11. The lip part 15b of the upper end region of the windshield side molding 15 overlaps the shelf face 22b via the side end part of the windshield upper molding 14.

The roof structure of the present embodiment is configured such that the shelf face 22b is provided at the front end part of the rail main face 22a of the roof side rail 11, and the lower face of the side end part of the windshield upper molding 14 abuts the shelf face 22b. Further, the windshield upper molding 14 abuts the front edge part of the roof panel 10 at the center region, and abuts the shelf face 22b of the roof side rail 11 at the side end region with the recessed groove 21 of the joint part 20 sandwiched therebetween. Therefore, according to the roof structure of the present embodiment, the downward drop of the side end part of the windshield upper molding 14 can be suppressed by the shelf face 22b, and the degradation of the appearance of the vehicle can be prevented.

Further, the roof structure of the present embodiment is configured so that the shelf face 22b of the roof side rail 11 is formed to be flush with the roof connecting face 10c of the roof panel 10 with the recessed groove 21 of the joint part 20 between the roof panel 10 and the roof side rail 11 sandwiched therebetween, and the windshield upper molding 14 abuts the roof connecting face 10c and the shelf face 22b. For this reason, the height of the abutting part with respect to the central region and the side end part region of the windshield upper molding 14 becomes the same, and unnecessary bending of the windshield upper molding 14 is hard to occur. Therefore, by adopting this configuration, the appearance of the vehicle can be kept good.

Further, in the roof structure of the present embodiment, the downward extending face 22c at the front end of the shelf face 22b of the roof side rail 11 is formed to be flush with the roof front end face 10b at the front end of the roof connecting face 10c of the roof panel 10. For this reason, since a separation distance between the downward extending face 22c and the upper end face of the windshield glass 13 is substantially the same as a separation distance between the roof front end face 10b and the upper end face of the windshield glass 13, it is possible to prevent only one face of the downward extending face 22c and the roof front end face 10b from interfering with the upper end face of the windshield glass 13. Therefore, when this structure is adopted, it is possible to suppress an increase in the clearance between one of the roof front end face 10b and the downward extending face 22c and the windshield glass 13, thereby preventing the appearance from being degraded.

Furthermore, in the case of the present embodiment, since no step is generated between the roof front end face 10b and the downward extending face 22c in which the end parts are caused to butt against each other, the sealing material 26 can be easily and reliably applied to the gap between the roof front end face 10b and the downward extending face 22c.

Further, the roof structure of the present embodiment is configured so that the space between the roof front end face 10b and the downward extending face 22c is sealed by the sealing material 26, and the windshield upper molding 14 abuts the rear side of a portion to which the sealing material 26 is applied between the roof front end face 10b and the downward extending face 22c. Therefore, the portion to which the sealing material 26 is applied between the roof front end face 10b and the downward extending face 22c can be covered and concealed with the windshield upper molding 14. Therefore, when this structure is adopted, it is possible to suppress a degradation of appearance due to the fact that the portion to which the sealing material 26 is applied is seen from the outside.

Further, the roof structure of the present embodiment is configured so that the windshield side molding 15 is provided on the rail extension part 23 of the roof side rail 11, and the windshield side molding 15 abuts the upper face of the side end part of the windshield upper molding 14. Therefore, the side end part of the windshield upper molding 14 can be covered and concealed with the windshield side molding 15. Therefore, when this configuration is adopted, it is possible to suppress a degradation of the appearance due to the fact that the terminal on the side part of the windshield upper molding 14 is seen from the outside.

Further, the roof structure of the present embodiment is configured so that the windshield side molding 15 is provided with the lip part 15b that abuts the side edge part of the windshield glass 13 and the upper face of the side end part of the windshield upper molding 14, and the lip part 15b overlaps the shelf face 22b via the side end part of the windshield upper molding 14. For this reason, it is possible to suppress the bending of the side end part of the windshield upper molding 14, by the shelf face 22b of the roof side rail 11 and the lip part 15b of the windshield side molding 15.

Further, in the case of the present embodiment, since the side end part of the windshield upper molding 14 is sandwiched between the shelf face 22b and the lip part 15b of the windshield side molding 15, it is possible to prevent a gap from being generated between the side end part of the windshield upper molding 14 and the windshield side molding 15. Therefore, when this configuration is adopted, the appearance of the vehicle can be further enhanced.

The present invention is not limited to the above embodiment, and various design changes can be made without departing from the scope of the invention.

REFERENCE SIGNS LIST

10 Roof panel
10a Roof upper face
10b Roof front end face
10c Roof connecting face
11 Roof side rail
12 Front pillar
13 Windshield glass
14 Windshield upper molding
15 Windshield side molding
15b Lip part
20 Joint part
21 Recessed groove
22 Rail main part
22a Rail main face
22b Shelf face
22c Downward extending face
23 Rail extension part
24 Glass-receiving part
26 Sealing material

What is claim is:

1. A vehicle roof structure comprising:
a roof panel which forms a roof part of a vehicle body;
a roof side rail disposed substantially along a vehicle body front-rear direction on an outer side of the roof panel in a vehicle width direction;
a windshield glass disposed in a front part of the roof panel; and
a windshield upper molding which is mounted on an upper edge part of the windshield glass and abuts a front edge part of the roof panel,
wherein the roof panel and the roof side rail are joined at a joint part substantially in the vehicle body front-rear direction, and a recessed groove which opens to an upper side of the vehicle body and extends substantially along the vehicle body front-rear direction is provided at an upper part of the joint part,
the roof side rail has:
a rail main part disposed on an outer side of the roof panel in the vehicle width direction across the joint part, and
a rail extension part which extends forward from a front end part of the rail main part,
a glass-receiving part, which is disposed to be offset to the outer side in the vehicle width direction from the joint part when viewed from above to receive an upper end side part of the windshield glass, is provided in the rail extension part,
a side part side class support wall, which is bent to the inner side in the vehicle width direction, is provided at the lower end of the glass-receiving part, and
the rail main part has:
a rail main face which forms an outer surface of the vehicle,
a shelf face which is provided to be recessed downward at a front end part of the rail main face, and on which a lower face of a side end part of the windshield upper molding abuts,
a first front face configured to extend downward from the front end part of the rail main face and connect the rail main part to the shelf face, and a downward extending face configured to extend downward from the front end part of the shelf face and connect the shelf face to the side part side glass support wall, wherein the rail main part is formed in a two-step shape by the rail main face, the first front face, the shelf surface, the downward extending surface, and the side part side glass support wall, the roof panel has a roof upper face which forms a roof face of the vehicle body, a roof front end face which extends downward from a front end side of the roof upper face, and a roof connecting face which connects the roof upper face and the roof front end face, and the windshield upper molding abuts the roof connecting face and the shelf face.

2. The vehicle roof structure according to claim 1, wherein the shelf face is formed to be flush with the roof connecting face across the recessed groove.

3. The vehicle roof structure according to claim 2, wherein the rail main part includes a downward extending face which extends downward from a front end part of the shelf face, and the roof front end face and the downward extending face are formed to be flush with each other.

4. The vehicle roof structure according to claim 3, wherein a space between the roof front end face and the downward extending face is sealed with a sealing material, and the windshield upper molding abuts a rear side of a portion to which the sealing material is applied between the roof front end face and the downward extending face.

5. The vehicle roof structure according to claim 1, wherein a windshield side molding which abuts a side edge part of the windshield glass is provided in the rail extension part of the roof side rail, and the windshield side molding abuts an upper face of the side end part of the windshield upper molding.

6. The vehicle roof structure according to claim 5, wherein the windshield side molding has a lip part which abuts the side edge part of the windshield glass and the upper face of the side end part of the windshield upper molding, and the lip part overlaps the shelf face via the side end part of the windshield upper molding.

* * * * *